Feb. 9, 1960 W. H. EDMUNDS 2,924,688

END MOUNTING OF A CURRENT LIMITING DEVICE ASSOCIATED WITH A CIRCUIT BREAKER

Filed Nov. 14, 1956 8 Sheets-Sheet 1

INVENTOR.
WILLIAM HAROLD EDMUNDS
BY Ostrolenk, Faber, Gerb & Soffen
ATTORNEYS

Feb. 9, 1960 W. H. EDMUNDS 2,924,688

END MOUNTING OF A CURRENT LIMITING DEVICE ASSOCIATED WITH A CIRCUIT BREAKER

Filed Nov. 14, 1956 8 Sheets-Sheet 2

INVENTOR.
WILLIAM HAROLD EDMUNDS

BY Ostrolenk, Faber, Gerb & Soffen

ATTORNEYS

INVENTOR.
WILLIAM HAROLD
EDMUNDS
BY Ostrolenk, Faber,
Gerb & Soffen
ATTORNEYS

Feb. 9, 1960 W. H. EDMUNDS 2,924,688

END MOUNTING OF A CURRENT LIMITING DEVICE ASSOCIATED WITH A CIRCUIT BREAKER

Filed Nov. 14, 1956 8 Sheets-Sheet 4

INVENTOR.
WILLIAM HAROLD EDMUNDS

BY Ostrolenk, Faber, Gerb & Soffen
ATTORNEYS

Feb. 9, 1960 W. H. EDMUNDS 2,924,688

END MOUNTING OF A CURRENT LIMITING DEVICE ASSOCIATED WITH A CIRCUIT BREAKER

Filed Nov. 14, 1956 8 Sheets-Sheet 5

INVENTOR.
WILLIAM HAROLD EDMUNDS

BY Ostrolenk, Faber, Gerb & Soffen
ATTORNEYS

INVENTOR.
WILLIAM HAROLD EDMUNDS
BY Ostrolenk, Faber, Gerb & Soffen
ATTORNEYS

INVENTOR.
WILLIAM HAROLD EDMUNDS
BY Ostrolenk, Faber, Gerb & Soffen
ATTORNEYS

INVENTOR.
WILLIAM HAROLD EDMUNDS
BY Ostrolenk, Faber, Gerb & Soffen
ATTORNEYS

United States Patent Office 2,924,688

Patented Feb. 9, 1960

2,924,688

END MOUNTING OF A CURRENT LIMITING DEVICE ASSOCIATED WITH A CIRCUIT BREAKER

William Harold Edmunds, Havertown, Pa., assignor to I-T-E Circuit Breaker Company, Philadelphia, Pa., a corporation of Pennsylvania Application November 14, 1956, Serial No. 622,042

19 Claims. (Cl. 200—116)

My invention relates to the construction of a circuit interrupting device wherein a circuit breaker mounted within a first housing is electrically and mechanically coordinated with a current limiting device mounted within a second housing, the current limiting device being mounted on an extension of the base of the circuit breaker.

The manner in which electrical and mechanical coordination between a current limiting device and a circuit breaker can be achieved is illustrated in my copending application Serial No. 461,378, filed October 11, 1954, and a construction wherein the current limiters and circuit breaker are placed in individual housings which are removably connected to one another is set forth in copending application Serial No. 472,969, filed December 3, 1954, now Patent No. 2,888,535.

In essence, the electrical and mechanical coordination between a current limiting device and a circuit breaker enables the use of a circuit breaker having a relatively low interrupting capacity to be used in an electrical circuit having an available short-circuit in excess of the interrupting capacity of the circuit breaker itself.

For all magnitudes of over-current and fault current within the range capable of being interrupted by the circuit breaker, the trip characteristics are such that the time delay trip or the magnetic trip will initiate operation of the circuit breaker so that the cooperating contacts of all poles thereof are moved to the disengaged position. However, if a severe short-circuit should occur, the magnitude of which may exceed the interrupting rating of the circuit breaker, the current limiting device will rupture and thereby completely interrupt the fault current associated with the phase in which it occurred.

In order to prevent single phasing and to provide an automatic disconnect switch in coordination with the current limiting device, mechanical coordination is provided whereby the rupture of the current limiting device will result in the simultaneous opening of the cooperating contacts of each pole of the circuit breaker.

My copending application Serial No. 472,969, filed December 3, 1954, sets forth an embodiment wherein a circuit breaker and current limiting device which operate in accordance with the above principles are housed in individual and removable housings. In application Serial No. 472,969, however, the current limiting device is mounted on top of the circuit breaker or, more specifically, on top of the trip unit of the circuit breaker which is adapted to cooperate with the current limiting device.

It has been found that this construction leads to many undesirable features. By way of example, it is extremely difficult to gain access to the circuit breaker trip unit for calibration of thermal and instantaneous tripping.

Furthermore, the construction leads to a complex trip unit requiring many parts and seriously reduces accessibility to the circuit breaker operating handle. That is, it is very difficult to operate the circuit breaker operating handle when resetting the circuit breaker, this problem being particularly severe when the circuit interrupting device is mounted high on a switch board or wall.

A still further undesirable feature of the top mounting of current limiting devices is that the majority of the mechanical and electrical members connecting the devices will be exposed from the front of the switchboard front sheet when the current limiting device housing is removed.

The principle of my invention is to mount the current limiting device at the end of the circuit breaker and, if possible, adjacent to the trip unit of the circuit breaker.

In mounting the current limiting device at the end of the circuit breaker, the circuit breaker base is provided with disconnect contacts which cooperate with the current limiting fuse disconnect contacts at one end thereof. If desired, existing standard circuit breakers may be modified for this purpose by adding an extension to the base of the circuit breaker wherein the circuit breaker disconnect contacts are used to cooperate with one of the current limiting device disconnect contacts and a second set of contacts are provided in the additional base member for receiving the other disconnect contacts of the current limiting device.

In the foregoing, the term "extension of the base of the circuit breaker" will designate either the use of an integral circuit breaker containing the required disconnects or the use of a separate extension member which includes the additional disconnects.

Another set of contacts may be added in the extended base of the circuit breaker which are so adapted as to be plugged into a switchboard.

Some of the major advantages of locating the current limiting device at the end of the circuit breaker are as follows: The construction offers first, a minimum number of parts and permits the use of standard circuit breakers which need only be adapted with an extended base and an interlock means for cooperating with the current limiting device.

Furthermore, the operating handle of the circuit breaker is easily accessible, the instantaneous trip devices are easily accessible for adjustment thereof, the current limiting devices may be connected behind a panel board with only operating handles for the circuit breaker and fuse housing protruding in front of the panel board and the volume in a panel board is considerably decreased from top mounting.

A further desirable feature is provided with my novel construction by constructing the mounting means which mounts the circuit breaker to be inaccessible when the current limiting device is in position. It will then be impossible to remove the circuit breaker without physically removing the current limiting device housing which will automatically trip the circuit breaker. Thus, the circuit breaker cannot be removed when in the energized position.

Accordingly, a primary object of my invention is to mount the current limiting device of a circuit interrupter comprised of a mechanically and electrically coordinated circuit breaker and current limiting device at the end of the circuit breaker.

Another object of my invention is to elongate the base of a standard circuit breaker and to provide the circuit breaker with interlock means for cooperating with a current limiting device which is connectible to the extended base of the circuit breaker.

In the past, it has been the practice to connect a circuit breaker to the load side of a system while the fuses in series with each circuit breaker phase are connected to the line side of the system since this connection places line potential across the fuse terminals when the fuse housing is removed, a still further disconnect means is required in front of the fuses to isolate the fuse terminals from the line so that safe maintenance may proceed.

With my novel combination, however, I have found that the circuit breaker may be connected to the line side while the fuses are connected to the load side, the circuit breaker acting as a positive disconnect for isolating the fuse terminals from line potential.

That is to say, the circuit breaker will, in view of the mechanical interlock with the current limiting fuses, operate as an automatic disconnect for the fuse terminals for either automatic operation of the circuit breaker or when the fuse housing is disconnected.

This novel connection provides the unexpected advantage of reducing the possibility of an arc striking between the current limiting fuse phases since after operation of the current limiting fuses and the associated voltage surge associated therewith, the circuit breaker opens to positively disconnect the fuse terminals from line potential, whereas in the past, this line potential was always across the circuit breaker phases.

It is to be noted that when making this novel connection, that the circuit breaker may be provided with the novel barriers set forth in my copending application Serial Number 622,952, filed May 19, 1956, now Patent No. 2,863,969.

Accordingly, a further important object of my invention is to connect the current limiting device of a circuit interrupting device utilizing an electrically and mechanically coordinated current limiting device and circuit breaker to the load side of the circuit breaker.

Another object of my invention is to provide a positive disconnect for circuit breaker contacts by connecting a current limiting device which cooperates with the circuit breaker to the load side of the circuit breaker.

In order to keep the fuse housing no wider than the circuit breaker housing, it has been found desirable to locate the disconnect contacts of the outer poles off center and displaced toward the center pole when compared to the standard circuit breaker disconnect contact position. Thus the center of the outer pole disconnect contacts will be displaced from the center of the outer pole terminal positions of the trip units.

The terminals of interchangeable trip units having the required interlock for coordination with a current limiter are then further constructed to correctly position the disconnect contacts in this off-set position.

In view of this construction, it will now be impossible to erroneously use the standard type of trip unit having no interlock means for a unit to be coordinated with a current limiter, thus leading to a situation where the circuit breaker would not automatically trip when the fuse blows. For in this case, the disconnect contacts of the circuit breaker would be positioned in the standard position and would not mate with the displaced contacts of the current limiting device.

Accordingly, another object of my invention is to locate at least one of the disconnect contacts of a circuit breaker housing in an off-center position with respect to the trip unit terminal so as to negate the possibility of the connection of a current limiting device to a circuit breaker having a standard trip unit.

A still further object of my invention is to locate at least one of the outer circuit breaker disconnects in an off-center position and towards the center of the circuit breaker so as to maintain the current limiting device housing no wider than the circuit breaker.

These and other objects of my invention will become apparent from the following description taken in connection with the drawings, in which.

Figure 5:
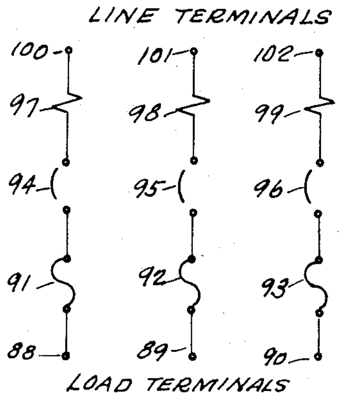

Figure 5 schematically illustrates a manner in which a circuit breaker and a current limiting device may be electrically connected where the current limiting device is connected to the load side.

Figure 5A:
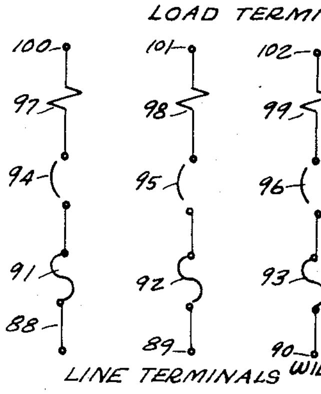

Figure 5A shows another manner in which the connection of Figure 5 could be made.

Figure 6:
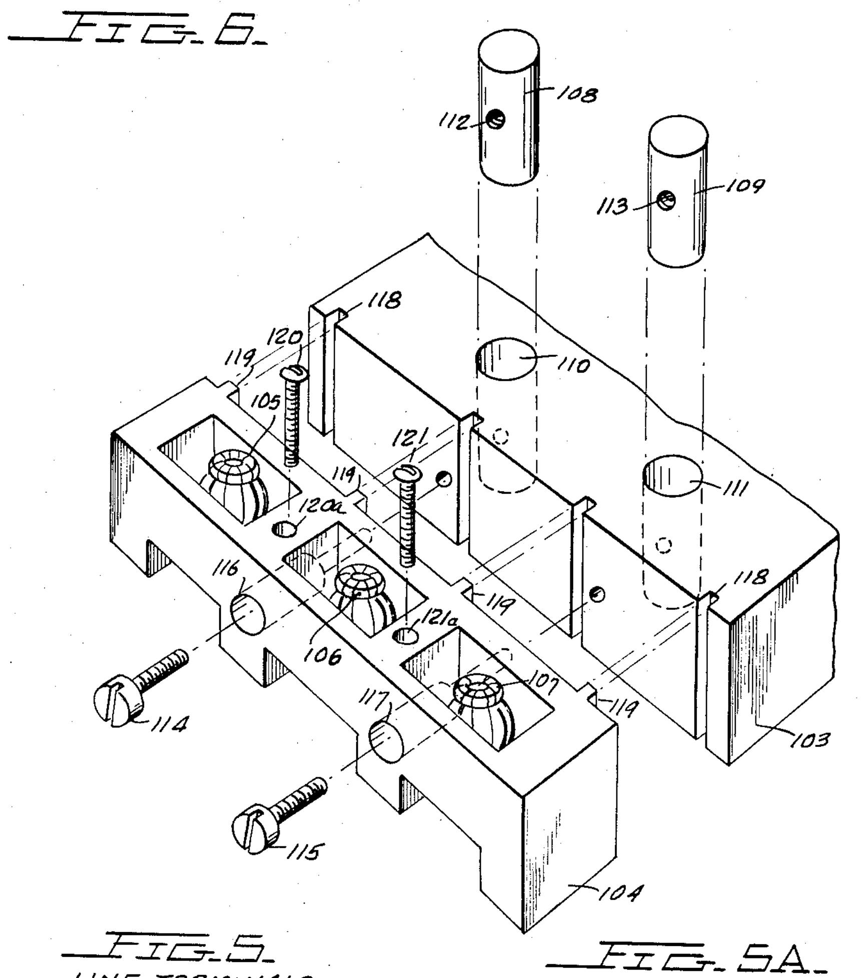

Figure 6 shows a fragmentary exploded perspective view of a manner in which a standard circuit breaker may be adapted to have its base extended so that a current limiting device may be mounted at the end of the circuit breaker.

Figure 7:
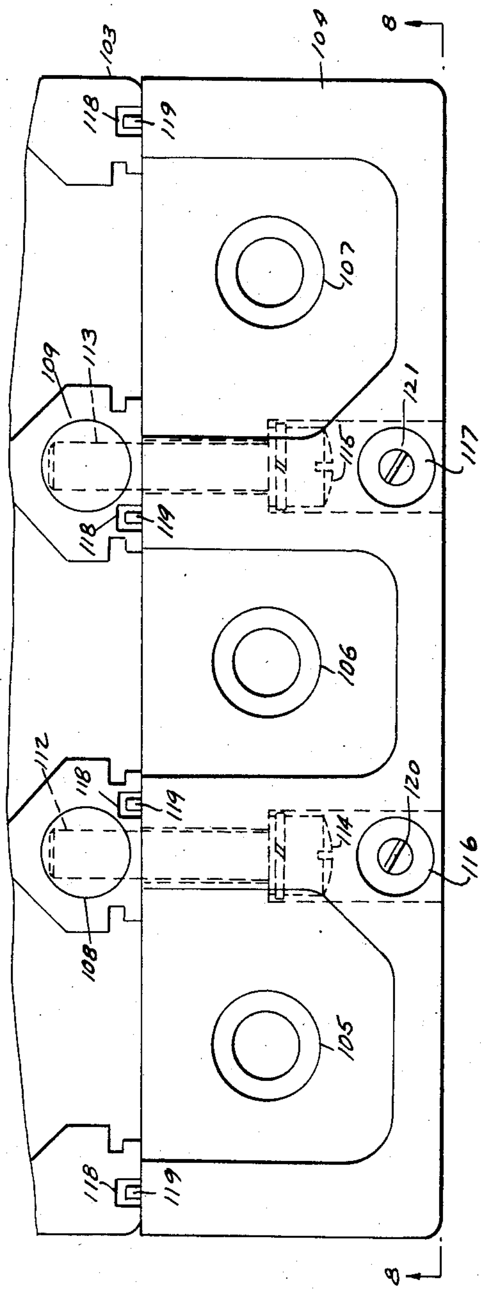

Figure 7 is a top view of Figure 6.

Figure 8:
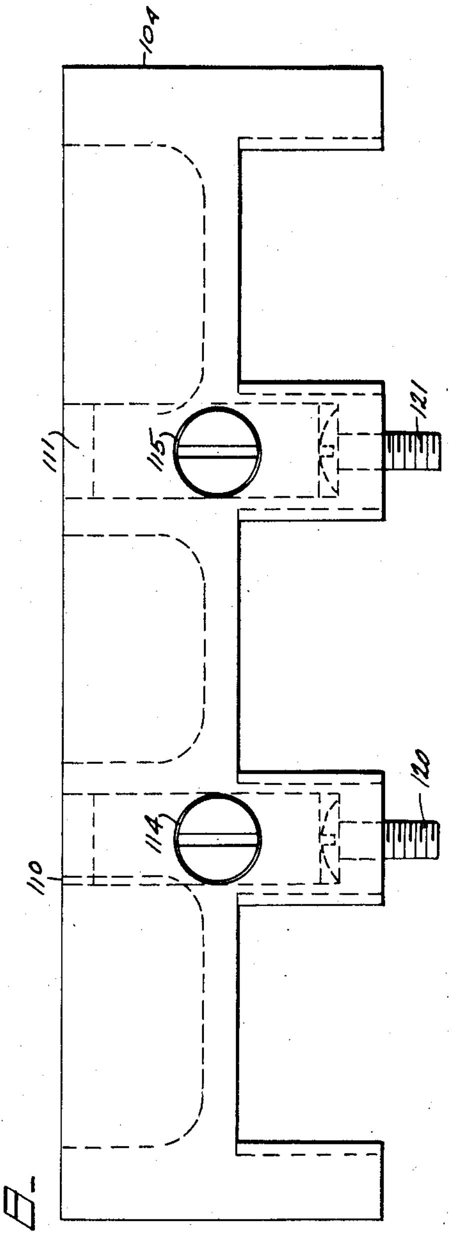

Figure 8 is a view of Figure 7 taken along the lines 8—8.

Figure 9:
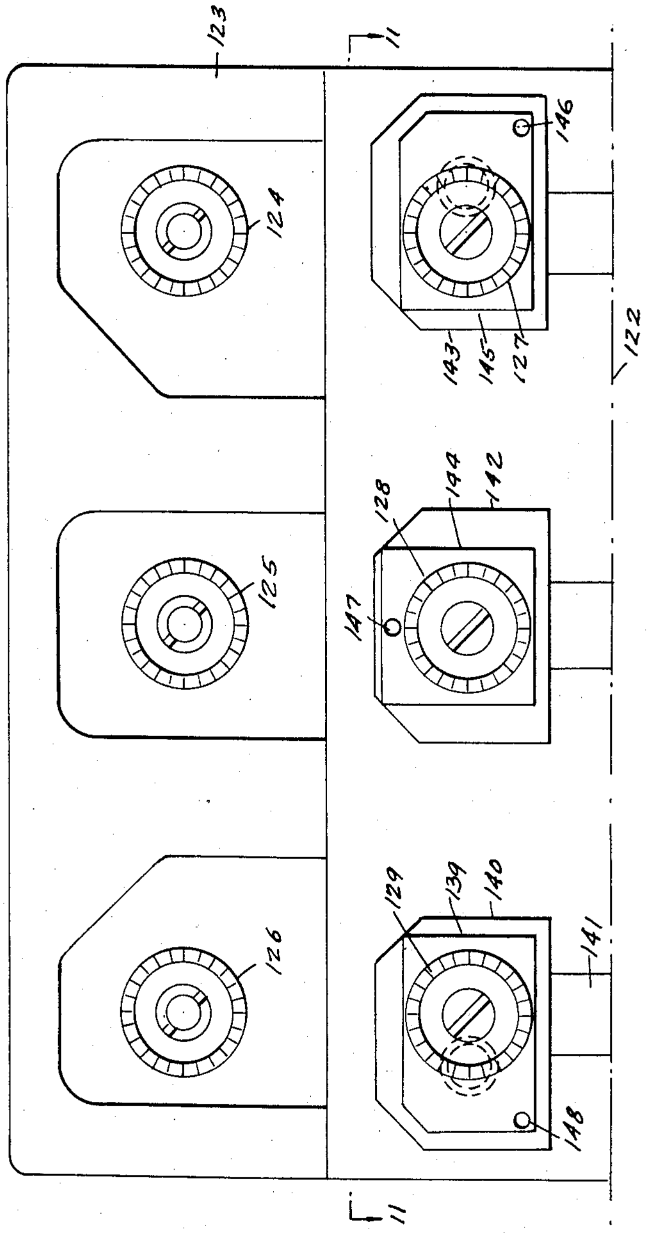

Figure 9 is a top view of a second embodiment of my invention and shows the outer disconnects being inwardly displaced.

Figure 10:
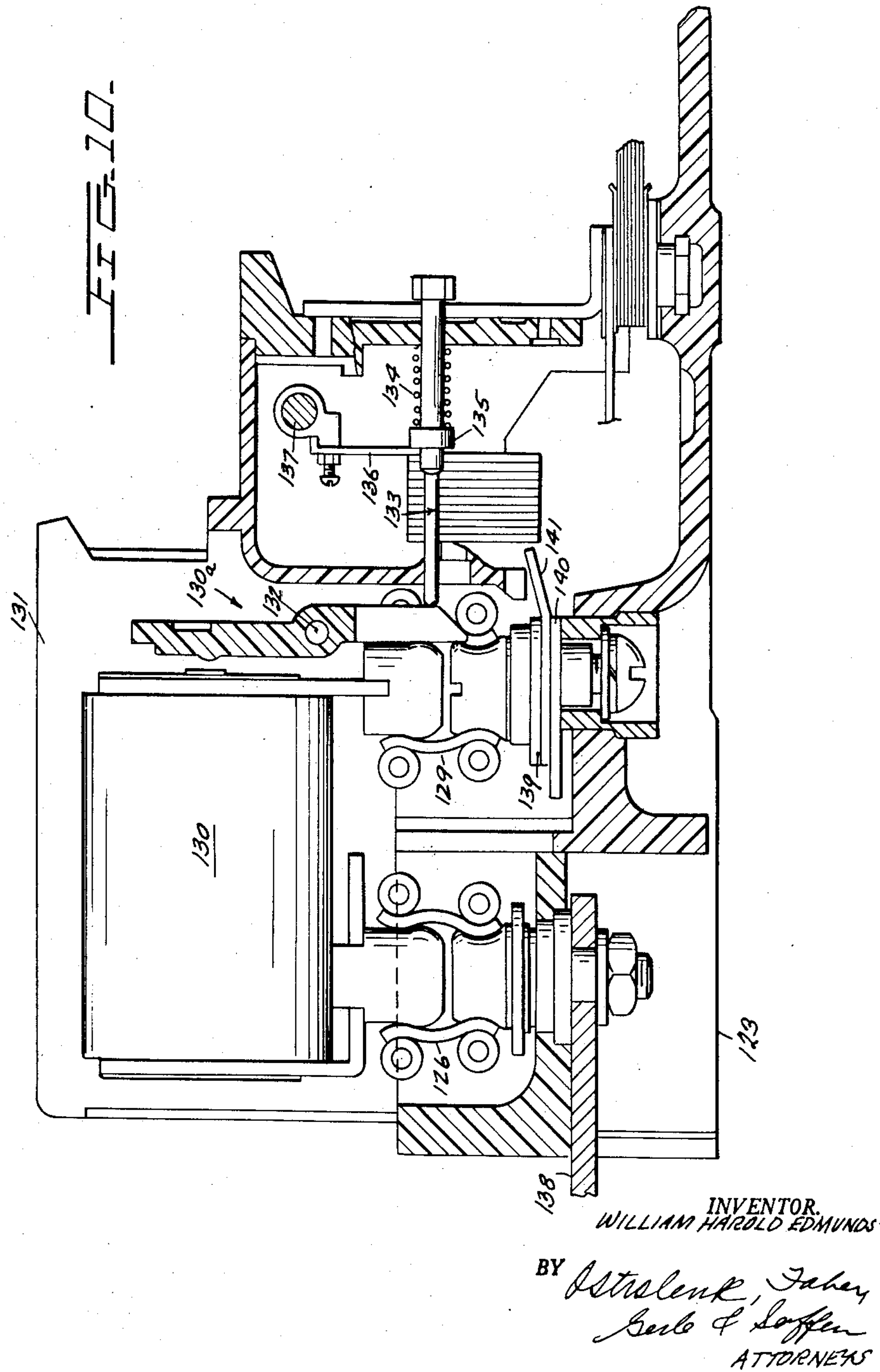

Figure 10 is a cross-sectional view of Figure 9 and shows one phase of the circuit breaker and current limiter associated therewith.

Figure 11:
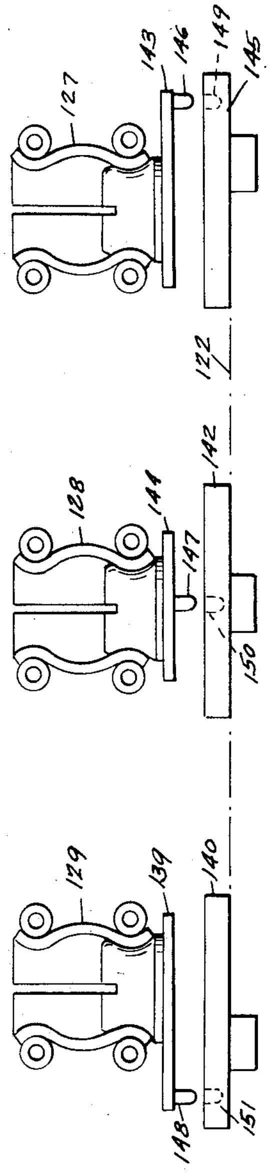

Figure 11 shows a view of Figure 9 along lines 11—11 with the positioning members removed from the trip unit terminals.

Figure 12:
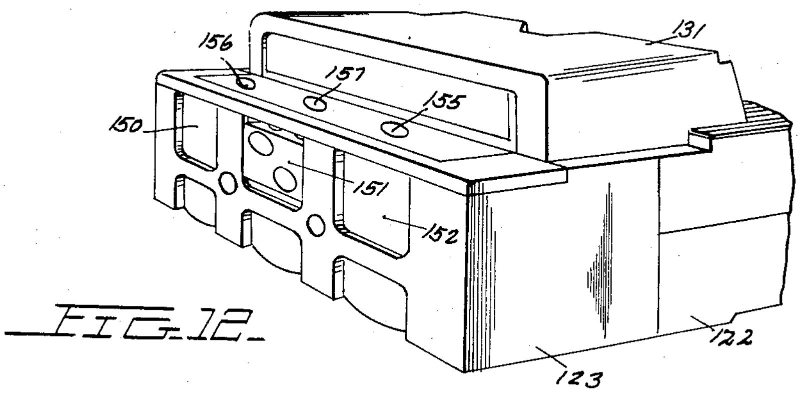

Figure 12 shows a perspective view of an embodiment of my novel invention wherein the extended base has terminal connectors embedded therein for front connection of external conductors.

Figure 13:
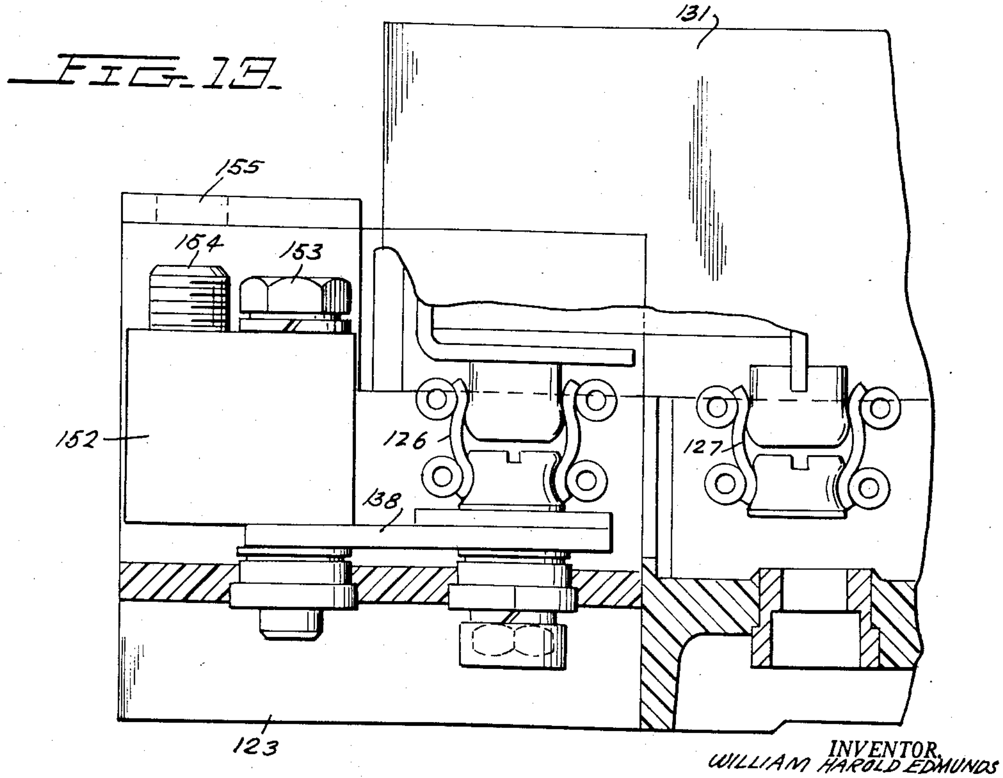

Figure 13 is a side cross-sectional view through one phase of Figure 12.

Figures 1, 1A, 4:
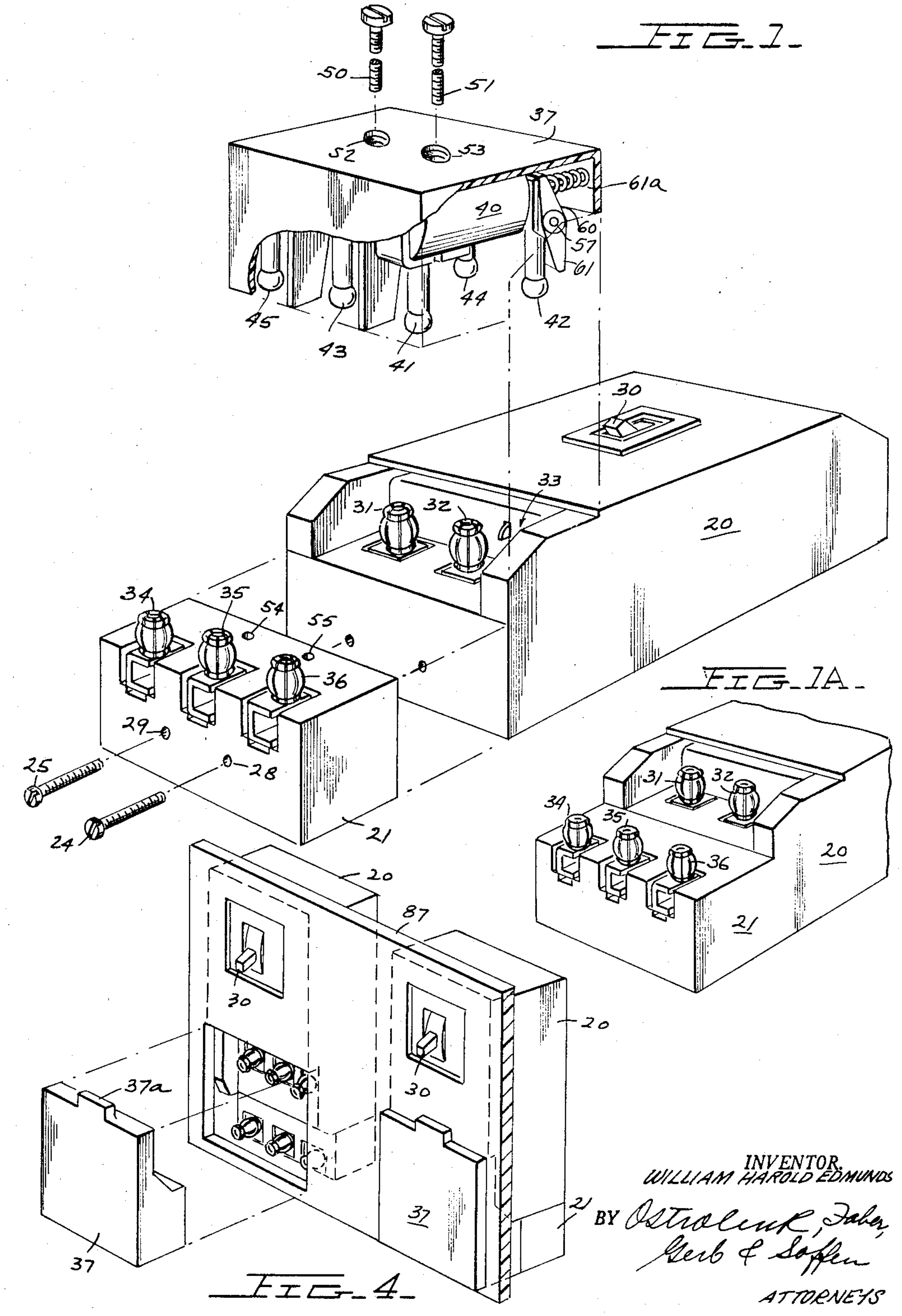
Figure 1 shows an exploded perspective view of a current limiting device mounted at the end of a circuit breaker in accordance with my novel invention.
Figure 1A is a fragmentary perspective view illustrating the end of a circuit breaker housing having an extended base formed integrally therewith.
Figure 4 shows a perspective view of two current interrupters of my novel invention mounted on a switchboard.

Referring first to Figure 1, a circuit breaker housing 20 has an extension 21 connectible to one end thereof by means of screws such as screws 24 and 25 which pass through openings 28 and 29 respectively, which fasten into cooperating openings in circuit breaker housing 20.

If desired, extension 21 could be an integral part of the circuit breaker base as is indicated in the fragmentary perspective view of Figure 1A.

Contained within circuit breaker housing 20 is an operating mechanism of any desired type such as that shown in my U.S. Patent No. 2,574,093 wherein operating handle 30 operates a pair of contacts for each phase of the circuit breaker. The contacts of each phase are then terminated by disconnect contacts 31, 32, and a contact 33 which cannot be seen in Figure 1, respectively.

The extension 21 of Figures 1 or 1A provides additional disconnect contacts 34, 35 and 36 which cooperate with contacts 31, 32 and 33 respectively for connecting a current limiting device in series with each of the circuit breaker phases.

Each of disconnect contacts 31 through 36 are of the tulip clip type, such as that described in copending application Serial No. 536,586, filed September 26, 1955, and assigned to the assignee of the instant invention, and are constructed to receive a stud in electrical and mechanical engagement. However, disconnect contacts 31 through 36 could be of any desired type.

Figure 2:
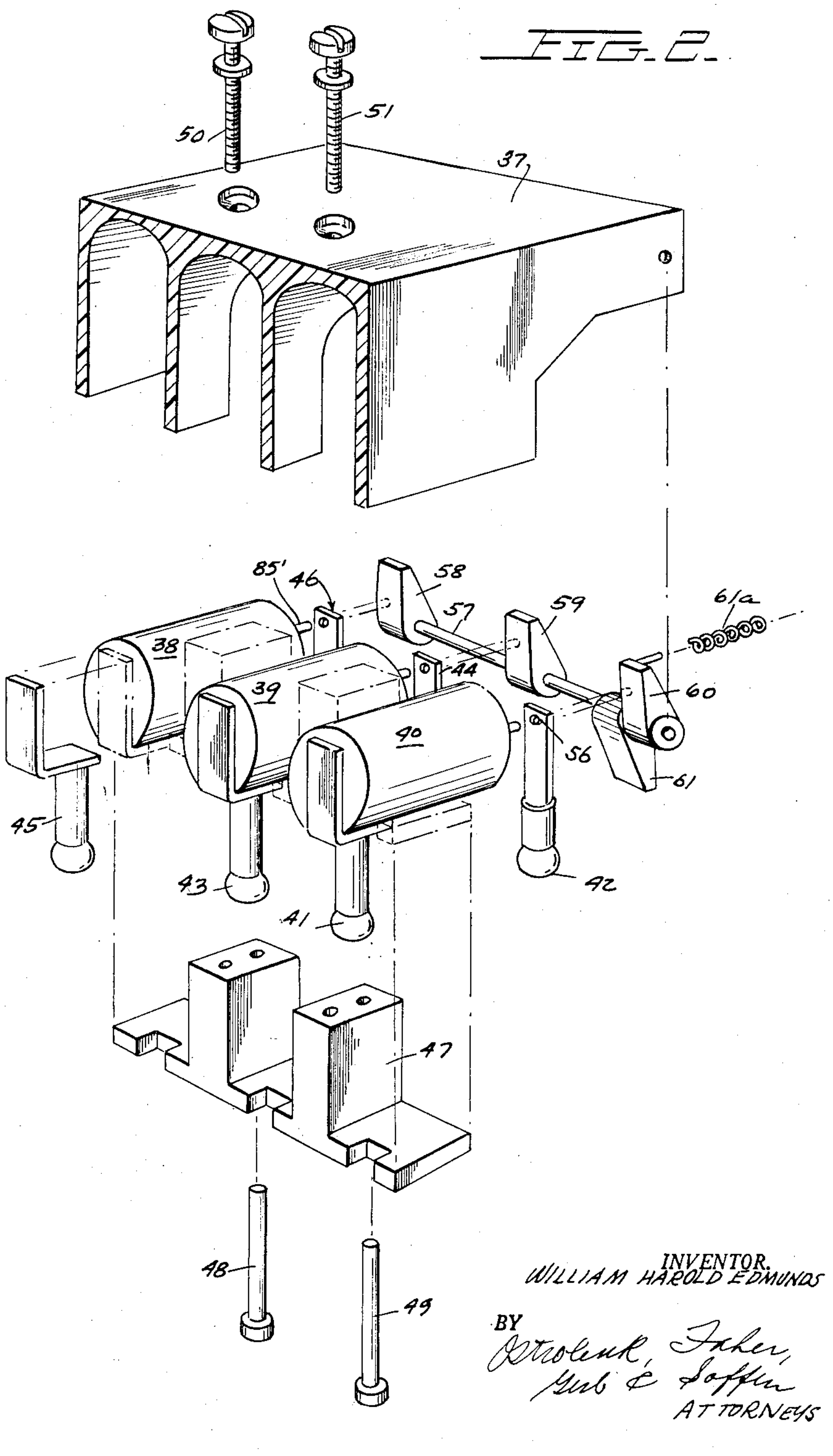
Figure 2 shows an exploded perspective cross-sectional view of the current limiting device housing of Figure 1 with the end of the housing removed.

Current limiting devices for cooperating with each of the circuit breaker phases are housed within housing 37. Figure 2 more specifically shows these current limiting devices as fuses 38, 39 and 40 which are provided with disconnect studs 41—42, 43—44, and 45—46 respectively. As seen in Figure 1, fuse 40 is connected to its corresponding phase by connection of disconnects 41 and 42 and disconnects 36 and 33 respectively. In a similar manner disconnects 43, 44 and 45, 46 of Figure 2 will cooperate with disconnects 35, 32 and 34, 31 respectively of Figure 1.

Fuses 38, 39 and 40 are maintained in housing 37 by retaining plate 47 which is fastened to housing 37 by screws 48 and 49 as seen in Figure 2 and described in copending application Serial No. 582,552, filed May 3, 1956, now Patent No. 2,905,791, and the assembled housing is connected to the circuit breaker housing by screws 50 and 51 which pass through apertures 52 and 53 respectively, and into tapped openings 54 and 55 of extension 21 as seen in Figure 1.

As may be seen in the above noted copending application Serial No. 472,969, each of fuses 38, 39 and 40 are provided with a striker pin such as striker pin 85 of fuse 40 which is ejected from the fuse upon operation thereof. The striker pins are positioned to pass through a cooperating aperture, such as aperture 56 of disconnect 42 which cooperates with striker pin 85.

An auxiliary tripper bar 57 is pivotally mounted within housing 37 as seen in Figures 1 and 2 and as best seen in Figure 2, tripper bar 57 has extensions 58, 59 and 60 thereon which are positioned to be engaged by the striker pins of fuses 38, 39 and 40 respectively upon operation thereof.

A further extension 61 is fastened to auxiliary tripper bar 57 which, as will be seen hereinafter, is biased into operative engagement with the tripper bar of the circuit breaker by biasing spring *61a*.

Figure 3:
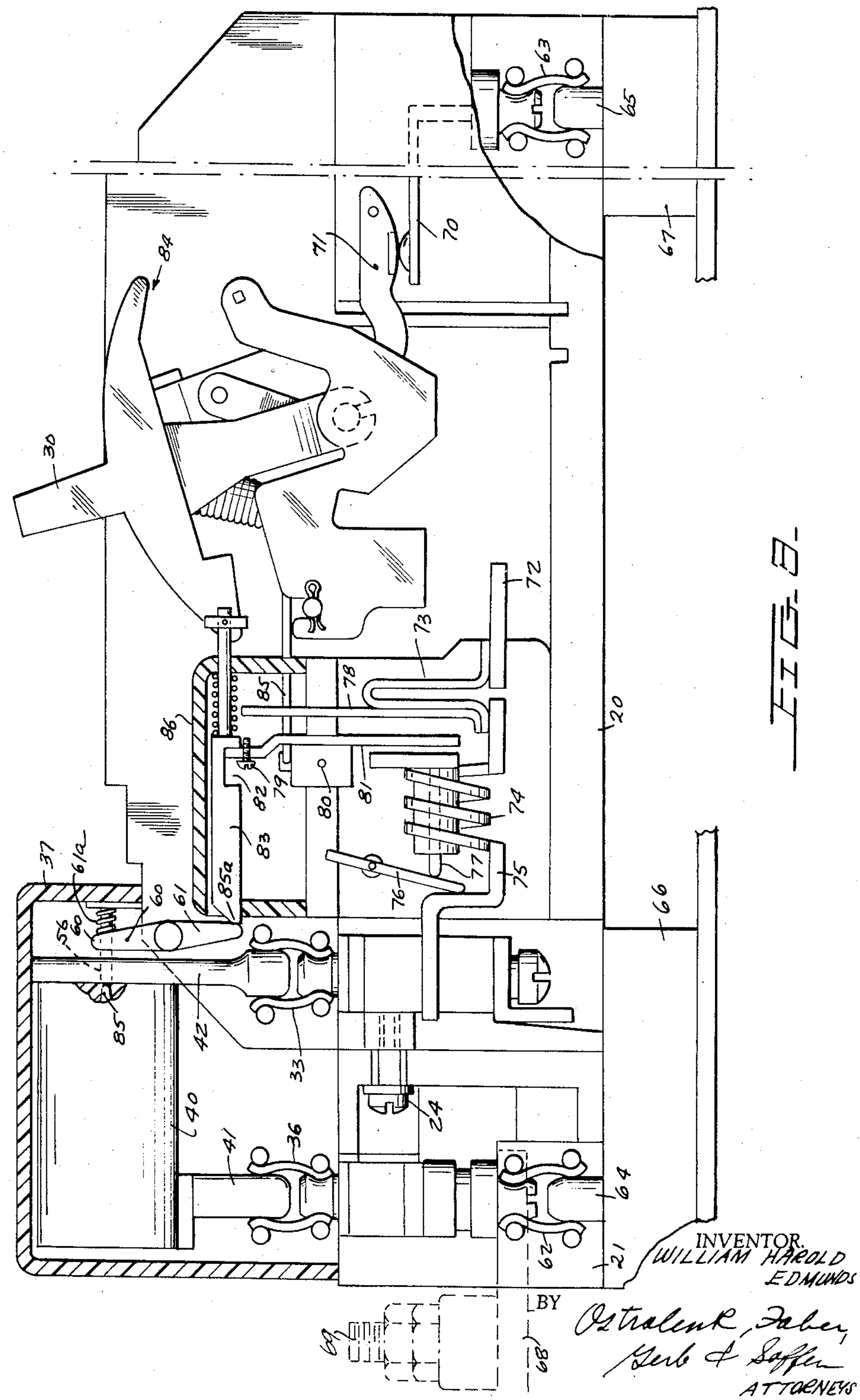
Figure 3 shows a side cross-sectional view of Figure 1 in which the coordination between the current limiting device and the circuit breaker tripping means is shown.

Figure 3 shows a cross-sectional view of the assembled components of Figure 1 when taken through the phase including fuse 40.

As seen in Figure 3 which shows screw 24 fastened to circuit breaker housing 20, a tulip clip type contact 62 is electrically connected to contact 36 and is fastened within housing 21 in any desired manner. Clearly, a set of disconnects similar to disconnect 62 will be provided for each of disconnects 34 and 35.

The circuit breaker 20 is provided with a similar set of disconnects such as disconnect contact 63, wherein disconnects 62 and 63 cooperate for plug-in engagement with studs 64 and 65 respectively of mounting blocks 66 and 67 which may be fastened within a switchboard. In a similar manner, each of the other phases will be provided with similar sets of disconnects for cooperating with corresponding mounting blocks.

As an alternative, Figure 3 shows that a straight terminal 68 could be brought out as seen in dotted lines where connection to the current interrupting device is made at lead connecting means 69.

The current path of the phase shown in Figure 3 includes stud 65, circuit breaker tulip clip 63, stationary contact 70, movable contact of contact arm 71, a pigtail (not shown) which connects contact arm 71 to conductor 72, heater 73, coil 74, conductor 75, tulip clip 33, stud 42, fuse 40, stud 41, tulip clip 36, tulip clip 62, stud 64.

Coil 74 has a pivotally mounted armature 76 and a plunger 77 associated therewith, these components comprising the magnetic trip unit. Heater 73 has bimetal 78 and adjusting screw 79 associated therewith, these components comprising the thermal trip unit.

A tripper bar 80 is then seen in Figure 3 as having member 81 fastened thereto which carries adjusting screw 79 in cooperating alignment with bimetal 78 and is itself aligned with plunger 77.

Member 81 has one end thereof protruding into slot 82 of trip rod 83 and is rotatable in a counterclockwise direction within slot 82.

The operating mechanism 84 has a latch member 85 connected thereto and constructed to be latched by tripper bar 80. When tripper bar 80 is rotated in a counterclockwise direction, however, latch member 85 will be unlatched to allow mechanism 84 to disengage the circuit breaker cooperating contacts of each phase since mechanism 84 is constructed to be common to each phase.

In the event of a prolonged overload, heater 73 will cause bimetal 78 to deflect into engagement with screw 79 to cause counterclockwise rotation of tripper bar 80 and tripping of the circuit breaker contacts.

Under fault conditions, coil 74 will create a strong magnetic field to cause armature 76 to drive plunger 77 into engagement with member 81, thus rotating tripper bar 80 counterclockwise to effect instantaneous tripping of the circuit breaker contacts.

Figure 3 further shows the striker pin 85 of fuse 40 as being positioned in registry with aperture 56 in disconnect 42 and extension 60 of auxiliary tripper bar 57 (see Figure 2).

When fuse 40 is operated (on faults above a predetermined value), striker pin 85 is ejected into engagement with extension 60 to rotate tripper bar 57 (Figure 2) clockwise against the biasing force of spring *61a*. This rotation will then remove extension 61 from tip *85a* of trip rod 83 and allow biasing spring 86 to drive trip rod 83 to the left and rotate tripper bar 80 counterclockwise for tripping the circuit breaker contacts.

Thus, upon operation of one of the current limiting fuses such as fuse 40 the circuit breaker contacts will be disengaged to prevent single phasing and to disconnect the circuit.

It is important to note that the same action would be obtained if the fuse housing 37 were disconnected from the circuit breaker housing 20. That is, extension 61 of tripper bar 57 would be removed from the tip *85a* of link 83 so as to allow subsequent rotation of the tripping means 80. Hence, in my novel construction wherein the fuse housing 37 is connected at the end of the circuit breaker housing 20, the circuit breaker cooperating contacts will be disengaged responsive either to operation of the fuse or to removal of the fuse housing.

Thus in adapting a standard circuit breaker with a base extension 21 and an interlock mechanism such as spring 86 and link 83, a current limiting device may now be connected to the end of the circuit breaker and afford all advantages associated therewith.

Figure 4 which shows two units constructed in accordance with this invention as being connected to the switchboard 87 so that the circuit breaker handle 30 and its escutcheon protrude through a first aperture and a second aperture allows insertion of fuse housing 37 from the front of the switch board. The right hand unit has the fuse housing 37 plugged into its circuit breaker base extension 21 while the left hand unit is disengaged from its cooperating base 21.

Clearly, the operating handle 30 of the right hand unit of Figure 4 is easily accessible for operation thereof. Furthermore, the cooperating disconnect contacts will be housed behind the switchboard 87 and only a portion *37a* of the housing 37 which serves as an operating handle protrudes to the front of the panel board 87 to allow disconnection thereof when desired.

Figure 5 schematically shows a manner in which my novel current limiting device and circuit breaker may be electrically connected. That is, Figure 5 shows a three-phase system wherein terminals 88, 89 and 90 are load terminals and are connected directly to the current limiting fuses, 91, 92, and 93 which are, in turn, connected to the circuit breaker phases 94, 95, and 96. Each of the circuit breaker phases 94, 95 and 96 are then schematically shown to have automatic trip means 97, 98 and 99, respectively, associated therewith.

These automatic trip means 97, 98 and 99 may be of any desired type, and would usually include combined thermal trip means for prolonged overloads and instantaneous trip means for severe faults. However, any type of individual or combined trip means could be used. The trip means 97, 98 and 99 are then seen as being connected to the line terminals 100, 101 and 102.

It is to be noted that by connecting the current limiting fuses 91, 92 and 93 to the load terminals 88, 89 and 90, that the fuse terminals will be completely and automatically isolated from the line when the fuse housing is disconnected without the additional disconnect means required when the circuit breaker is on the line side. For when the current limiting device housing is removed from its associated circuit breaker housing, it is clear that the circuit breaker contacts will be disengaged automatically in view of the mechanical coordination hereinbefore described.

Furthermore, when the fuse housing is disconnected, the circuit is completely de-energized and visual indication of this de-energization is obvious as is seen in Figure 4.

If it is desired to completely isolate the circuit breaker terminals from the line, then the connection of Figure 5A may be used where the fuse devices 91, 92 and 93 are connected to the line terminals.

In this case, after operation of the device, the line potential appears across the fuse terminals and access to these terminals is prohibited so long as the fuse housing is in place. Thus, phase to phase flashover within the circuit breaker after operation of the interrupting device is positively prevented since the circuit breaker terminals are completely isolated from the line.

Another method of securing a separate block to a circuit breaker base for the end mounting of a current limiting means is shown in Figures 6, 7 and 8 where a fragmentary portion of the circuit breaker base 103 is shown as having a block 104 added thereto.

The block 104 is adapted to carry therewith the disconnect contacts 105, 106 and 107 which will subsequently cooperate with one set of the current limiting device terminals while the other set of current limiting device terminals cooperates with the normally available circuit breaker terminals attached to the circuit breaker base as shown in Figure 3.

In the embodiment of Figures 6, 7 and 8, the circuit breaker base 103 has plugs 108 and 109 inserted in the normal mounting screw holes 110 and 111 respectively which are used to mount the circuit breaker when used as a standard circuit breaker device. The plugs 108 and 109 have holes 112 and 113 respectively tapped therein into which screws 114 and 115 which pass through holes 116 and 117 respectively may be secured, to thereby securely attach block 104 to the base 103. Both the base 103 and block 104 may be provided with depressions 118 and protrusions 119 respectively which serve to locate the two members and prevent sideward motion thereof.

It is to be understood, however, that many types of guiding and mounting of a separate block to a circuit breaker base may be utilized and the method shown in the preceding figures is illustrative only.

The type mounting shown in Figures 6, 7 and 8 is advantageous when the circuit breaker unit is mounted by the mounting screws 120 and 121 which pass through apertures 120*a* and 121*a* respectively of extended base 104 to subsequently engage a mounting surface (not shown). For in this case, the circuit breaker can not be removed from its mounting surface until the current limiting device is first disconnected to afford access to the screws 120 and 121.

Hence maintenance personnel are assured that the circuit breaker is de-energized (due to the mechanical coordination described above) and that there is no potential across the fuse terminals when the connection of Figure 5 is adhered to, and the fuse device is removed.

Another embodiment of my invention is shown in Figures 9 and 10 where Figure 9 shows a top view of the base of a circuit breaker 122 having an extended base 123 in accordance with my novel invention. The extension 123 carries disconnects 124, 125 and 126 while the circuit breaker has disconnects 127, 128 and 129 associated therewith.

Figure 10 shows a cross-sectional view of Figure 9 when taken through disconnects 126 and 129 and further shows the fuse 130 which is contained within a housing 131 in the same manner as set forth hereinbefore as connected across disconnects 126 and 129.

In a manner similar to that set forth in Figures 1, 2 and 3, fuse 130 is positioned to operate auxiliary tripper bar 130*a* which is pivoted at point 132, and biased counterclockwise thereabout, to allow trip rod 133 to be driven to the left by spring 134. This operation will bring collar 135 which is fastened to the rod 133 into engagement with extension 136 of tripper bar 137 which operates to disconnect the contacts of each circuit breaker phase upon operation thereof. Clearly, magnetic and thermal trip means could also operate on tripper bar 137 in any desired manner such as that shown in Figure 3.

A portion of the current path through the phase shown in Figure 10 is from conductor 141, trip unit terminal 140, positioning member 139 of disconnect 129, disconnect 129, fuse 130, disconnect 126, and terminal bus 138. The current path is completed (although not shown), through trip unit members connected to conductor 141, the circuit breaker cooperating contacts and a second terminal.

As seen in each of Figures 9 and 11, each of the other phases are provided with trip unit terminal members 142 and 145 respectively, which are similar to trip unit terminal member 140 and positioning members 144 and 143 of disconnects 128 and 127 respectively, which are similar to positioning member 139 of disconnect 129.

As will be shown hereinafter, this construction places the outer disconnects 127 and 129 in an inwardly displaced position to allow the width of the current limiting housing to be at least the same or smaller than the width of the circuit breaker housing. For if the circuit breaker trip unit terminals of a standard circuit breaker define the center of the disconnect contact, the outer fuses will protrude beyond the width of the circuit breaker housing.

Furthermore, this displacement of the disconnect contacts will prevent the connection of a current limiting fuse to a standard circuit breaker which is not adapted for cooperation therewith. That is to say, the disconnects of the current limiters will not register with the circuit breaker disconnects. Thus, a trip unit not having the required interlock for operating the circuit breaker contacts upon operation of current limiting fuses cannot be connected to the fuse housing.

The positioning of disconnects 127, 128 and 129 is effected as is best seen in Figures 9 and 11 by dowels 146, 147 and 148 respectively, which cooperate with apertures 149, 150 and 151 respectively of trip unit terminals 145, 142 and 140 respectively.

The central phase containing disconnect 128 has aperture 150 positioned in alignment with trip unit terminal 142 to thereby place disconnect 128 in alignment therewith. The phases containing disconnects 127 and 129, however, have apertures 149 and 151 off-set to thereby position disconnects 127 and 129 inwardly with respect to their associated trip unit terminals.

Hence, the fuses within a fuse housing may now be displaced toward a central position to allow the width of the fuse housing to register with the width of the circuit breaker housing. Furthermore, the fuse housing cannot be connected to a circuit breaker having terminals which are spaced in the standard manner.

Figures 12 and 13 show a further embodiment of my novel invention which is similar to that of Figure 10, wherein the extended circuit breaker base portion 123 is made longer than that of Figure 10 so that connecting terminals 150, 151 and 152 of Figure 12 which shows a perspective view of the base portion are embedded in the base.

Thus, as shown in Figure 13, the terminal 152 is fastened in the base 123 by means of bolt 153 which cooperates with fixed threads in the base while the other terminals 150 and 151 of Figure 12 are positioned in the same manner. Conductor 138 may be connected to terminal 152 by the mounting bolt 153 which, as seen best in Figure 13, has a screw 154 threadably mounted thereon for connecting external conductors to the terminal.

Access to screw 154 is provided by aperture 155 as shown in Figure 13, while access to similar connecting screws for terminals 150 and 151 is provided by apertures 156 and 157 respectively as seen in Figure 12.

Although I have described preferred embodiments of my novel invention, many modifications and variations will now be evident to those skilled in the art. I prefer therefore to be limited not by the specific disclosure herein, but only by the appended claims.

I claim:

1. A current interrupting device comprising a current limiting fuse means removably mounted within a first housing and a circuit breaker mounted within a second housing; disconnect means for connecting said circuit breaker and said current limiting means; said circuit breaker second housing having an extended base at one end thereof; said current limiting first housing being removably mounted to said extended base when said disconnect means connects said circuit breaker and said current limiting means.

2. A current interrupting device comprising a current limiting fuse means removably mounted within a first housing and a circuit breaker mounted within a second housing; said current limiting means having a first and second disconnect contact associated therewith, said circuit breaker having a disconnect contact for cooperating with said first current limiting means disconnect contact; said circuit breaker having an extended base at one end thereof; said extended base carrying a disconnect contact for cooperating with said second current limiting means disconnect contact; said circuit breaker being constructed to have automatic trip means associated therewith for automatically operating said circuit breaker in mechanical coordination with said current limiting means; said current limiting means and said circuit breaker being connected in series when said first and second disconnect contacts are connected to their said cooperating contacts.

3. A current interrupting device comprising a current limiting fuse means removably mounted within a first housing and a circuit breaker mounted within a second housing; said current limiting means having a first and second disconnect contact stud associated therewith, said circuit breaker having a disconnect contact of the tulip clip type for cooperating with said first current limiting means disconnect contact stud; said circuit breaker having an extended base at one end thereof; said extended portion carrying a disconnect contact of the tulip clip type for cooperating with said second current limiting means disconnect contact stud; said circuit breaker being constructed to have automatic trip means associated therewith for automatically operating said circuit breaker in mechanical coordination with said current limiting means; said current limiting means and said circuit breaker being connected in series when said first and second disconnect contacts are connected to their said cooperating contacts.

4. A current interrupting device for connecting a load to a line comprising a current limiting fuse means mounted within a first housing and a circuit breaker mounted within a second housing; said current limiting means having a first and second disconnect contact stud associated therewith, said circuit breaker having a disconnect contact of the type for cooperating with said first current limiting means disconnect contact stud; said circuit breaker having an extended base at one end thereof; said extended portion carrying a disconnect contact of the type for cooperating with said second current limiting means disconnect contact stud; said circuit breaker being constructed to have automatic trip means associated therewith for automatically operating said circuit breaker in mechanical coordination with said current limiting means; said current limiting means and said circuit breaker being connected in series when said first and second disconnect contacts are connected to their said cooperating contacts; said current limiting means forming the load side of said current interrupting device said circuit breaker comprising a disconnect means for isolating said current limiting means.

5. A circuit interrupting device for connecting a line and a load of a multiphase electrical system comprising a current limiting means removably mounted within a first housing and a multiphase circuit breaker mounted within a second housing; said current limiting means comprising a current limiting fuse for each phase; each of said current limiting fuses having a first and second disconnect contact associated therewith; said circuit breaker having a disconnect contact for each phase cooperating with a corresponding contact of said current limiting fuse first disconnect contact; said circuit breaker having an extended portion at one end thereof; said extended portion carrying a disconnect contact for each phase of said multiphase system for cooperating with a corresponding contact of said current limiting means second disconnect contact; each phase of said multiphase system having one of said current limiting fuses and one of said circuit breaker phases connected in series therewith when each of said first and second disconnect contacts are connected to their said cooperating contacts; said disconnect contacts of said extended portion of said circuit breaker being connectible to the load end of said circuit interrupting device.

6. A circuit interrupting device for a multiphase electrical system comprising a current limiting means mounted within a first housing and a multiphase circuit breaker mounted within a second housing; said current limiting means comprising a current limiting fuse for each phase; each of said current limiting fuses having a first and second disconnect contact associated therewith; said circuit breaker having a trip unit disconnect contact for each phase cooperating with a corresponding contact of said current limiting fuse first disconnect contact; said circuit breaker having an extended portion at one end thereof; said extended portion carrying a disconnect contact for each phase of said multiphase system for cooperating with a corresponding contact of said current limiting means second disconnect contact; each phase of said multiphase system having one of said current limiting fuses and one of said circuit breaker phases connected in series therewith when each of said first and second disconnect contacts are connected to their said cooperating contacts; a trip unit disconnect contact associated with at least one phase of said circuit breaker and said current interrupting means cooperating contact being offset from a normal position to prevent connection between said current limiting means and a circuit breaker when the trip unit of said circuit breaker has its disconnect contacts in a standard position.

7. A circuit interrupting device for a multiphase electrical system comprising a current limiting means mounted within a first housing and a multiphase circuit breaker mounted within a second housing; said current limiting means comprising a current limiting fuse for each phase; each of said current limiting fuses having a first and second disconnect contact associated therewith; said circuit breaker having a trip unit disconnect contact for each phase cooperating with a corresponding contact of said current limiting fuse first disconnect contact; said circuit breaker having an extended portion at one end thereof; said extended portion carrying a disconnect contact for each phase of said multiphase system for cooperating with a corresponding contact of said current limiting means second disconnect contact; each phase of said multiphase system having one of said current limiting fuses and one of said circuit breaker phases connect in series therewith when each of said first and second disconnect contacts are connected to their said cooperating contacts; a trip unit disconnect contact associated with at least one phase of said circuit breaker and said current interrupting means cooperating contact being offset from a normal position to prevent connection between said current limiting means disconnect contact and a circuit breaker trip unit having each of its disconnects in a normal position; said offset trip unit disconnect contact being offset towards the center of said circuit breaker base to allow the width of said current interrupting means first housing to be the same as the width of said circuit breaker second housing.

8. In combination, a circuit breaker having a pair of cooperable contacts and a current responsive element which responds to fault currents for effecting disengagement of said contacts and a housing for said circuit breaker elements; terminals extending therefrom for connecting said circuit breaker to an electrical circuit to be protected by said circuit breaker; said circuit breaker having a predetermined interrupting rating; a current limiting device having a fusible element and operable at and above a predetermined percentage of the available fault current of the circuit to be protected by said circuit breaker for effecting opening of the circuit at values of current above the interrupting rating of said circuit breaker; a housing for removably mounting said current limiting device and disconnect contacts or removably connecting said current limiting device to said circuit breaker housing and for simultaneously connecting said circuit breaker and current limiting device in series with said terminals of said circuit breaker; said housing for said circuit breaker having an extended base at one end thereof for supporting at least one of said circuit breaker terminals.

9. A circuit protective device having a first and second housing; said first housing containing a multipole circuit breaker; each pole of said circuit breaker having a pair of cooperating contacts with an engaged and disengaged position; a trip element; said trip element responsive to fault currents below a first predetermined current magnitude to effect disengagement of said cooperating contacts; current limiting devices; said current limiting devices removably mounted in said second housing; said first and second housing having cooperating disconnect contacts to permit said second housing to be removably connected to said first housing; said disconnect contacts connecting said cooperating contacts, said trip means and said current limiting device in electrical series; said current limiting device having a fusible element constructed to interrupt current flow above said first predetermined current magnitude; said disconnect contacts positioning said second housing to permit mechanical coordination between said current limiting device and said circuit breaker; said housing for said circuit breaker having an extended base for supporting said disconnect contacts associated with said circuit breaker.

10. In a multi-pole circuit protective device comprised of a circuit breaker and current limiting fuse means; said circuit breaker contained within a first housing; a pair of cooperating contacts, a trip element and disconnect contacts associated with each pole of said circuit breaker; said current limiting devices removably connected to a second housing; said second housing having a current limiting device and disconnect contacts therefor associated with each pole of said circuit breaker; said second housing removably connected to said circuit breaker by means of said disconnect contacts; means to move said cooperating contacts from said engaged position to said disengaged position when said second housing is removed from said first housing; said current limiting device associated with any one pole of said circuit breaker electrically connected to interrupt the current flow in its associated pole when the current magnitude exceeds a first predetermined value; each of said current limiting device comprising means to simultaneously move the cooperating contacts of all poles of said circuit breaker from said engaged position to said disengaged position; said housing for said circuit breaker having an extended base for supporting said disconnect contacts associated with said circuit breaker.

11. In a multi-pole circuit protective device comprised of a circuit breaker and current limiting fuse means; said circuit breaker contained within a first housing; a pair of cooperating contacts; a trip element and disconnect contacts associated with each pole of said circuit breaker; said current limiting devices removably connected to a second housing; said second housing having a current limiting device and disconnect contacts therefor associated with each pole of said circuit breaker; said second housing removably connected to said circuit breaker by means of said disconnect contacts; means to move said cooperating contacts from said engaged position to said disengaged position when said second housing is removed from said first housing; said current limiting device associated with any one pole of said circuit breaker electrically connected to interrupt the current flow in its associated pole when the current magnitude exceeds a first predetermined value; each of said current limiting devices comprising means to simultaneously move the cooperating contacts of all poles of said circuit breaker from said engaged position to said disengaged position; means to move said cooperating contacts from said engaged position to said disengaged position when said second housing is removed from said first housing; said housing for said circuit breaker having an extended base for supporting said disconnect contacts associated with said circuit breaker.

12. A multi-pole circuit breaker and current limiting fuse means; said multi-pole circuit breaker contained within a first housing and having a pair of cooperating contacts; disconnect contact means and a trip element associated with each pole of said circuit breaker; a common tripper bar for all poles of said multi-pole circuit breaker; each of said trip elements operatively connected to said common tripper bar to result in simultaneous disengagement of said contacts associated with each pole of said circuit breaker on the occurrence of a fault current in any one pole below a predetermined current magnitude; a second housing containing a current limiting device and disconnect contact means associated with each pole of said circuit breaker; said second housing and said current limiting means removably connected to said circuit breaker by said disconnect contact means; said current limiting means operative to interrupt current magnitudes flowing in its respective pole above the first predetermined magnitude; each of said current limiting devices operatively connected to said common tripper bar to simultaneously disengage all of said cooperating contacts of said circuit breaker; means operatively connected to cause simultaneous disengagement of all the contacts of said circuit breaker when said second housing is removed from said first housing by the disengagement of said disconnect contact means; said housing for said circuit breaker having an extended base for supporting said disconnect contacts associated with said circuit breaker.

13. A multi-pole circuit breaker and current limiting fuse means; said multi-pole circuit breaker contained within a first housing and having a pair of cooperating contacts; disconnect contact means and a trip element associated with each pole of said circuit breaker; a common tripper bar for all poles of said multi-pole circuit breaker; each of said trip elements operatively connected to said common tripper bar to result in simultaneous disengagement of said contacts associated with each pole of said circuit breaker on the occurrence of a fault current in any one pole below a predetermined current magnitude; a second housing containing a current limiting device and disconnect contact means associated with each pole of said circuit breaker; said second housing and said current limiting means removably connected to said circuit breaker by said disconnect contact means; said current limiting means operative to interrupt current magnitudes flowing in its respective pole above the first predetermined magnitude; each of said current limiting devices operatively connected to said common tripper bar to simultaneously disengage all of said cooperating contacts of said circuit breaker; means operatively connected to cause simultaneous disengagement of all the contacts of said circuit breaker when said second housing is removed from said first housing by the disengagement of said disconnect contact means; said housing for said circuit breaker having an extended base for supporting said disconnect contacts associated with said circuit breaker; disconnection of said current limiting means effecting visually observable positive disconnection of a circuit including said series connected multi-pole circuit breaker and current limiting means.

14. A current interrupting device for connecting a load to a line comprising a current limiting fuse means mounted within a first housing and a circuit breaker mounted within a second housing; said current limiting means having a first and second disconnect contact stud associated therewith, said circuit breaker having a disconnect contact of the type for cooperating with said first current limiting means disconnect contact stud; said circuit breaker having an extended base at one end thereof; said extended portion carrying a disconnect contact of the type for cooperating with said second current limiting means disconnect contact stud; said circuit breaker being constructed to have automatic trip means associated therewith for automatically operating said circuit breaker in mechanical coordination with said current limiting means; said current limiting means and said circuit breaker being connected in series when said first and second disconnect contacts are connected to their said cooperating contacts; said current limiting means forming the load side of said current interrupting device said circuit breaker comprising a disconnect means for isolating said current limiting means; disconnection of said current limiting means effecting positive disconnection of said load and line.

15. A current interrupting device comprising a fusible means removably mounted within a first housing and a circuit breaker mounted within a second housing; said fusible means having a first and second disconnect contact associated therewith, said circuit breaker having a disconnect contact for cooperating with said first fusible means disconnect contact; said circuit breaker having an extended base at one end thereof; said extended base carrying a disconnect contact for cooperating with said second fusible means disconnect contact; said circuit breaker being constructed to have automatic trip means associated therewith for automatically operating said circuit breaker in mechanical coordination with said fusible means; said current limiting means and said circuit breaker being connected in series when said first and second disconnect contacts are connected to their said cooperating contacts.

16. A current interrupting device for connecting a load to a line comprising a fusible means removably mounted within a first housing and a circuit breaker mounted within a second housing; said fusible means having a first and second disconnect contact stud associated therewith, said circuit breaker having a disconnect contact of the type for cooperating with said first fusible means disconnect contact stud; said circuit breaker having an extended base at one end thereof; said extended portion carrying a disconnect contact of the type for cooperating with said second fusible means disconnect contact stud; said circuit breaker being constructed to have automatic trip means associated therewith for automatically operating said circuit breaker in mechanical coordination with said fusible means; said fusible means and said circuit breaker being connected in series when said first and second disconnect contacts are connected to their said cooperating contacts; said fusible means forming the load side of said current interrupting device said circuit breaker comprising a disconnect means for isolating said fusible means.

17. In a multi-pole circuit protective device comprised of a circuit breaker and fusible means; said circuit breaker contained within a first housing; a pair of cooperating contacts, a trip element and disconnect contacts associated with each pole of said circuit breaker; said fusible devices removably connected to a second housing; said second housing having a fusible device and disconnect contacts therefor associated with each pole of said circuit breaker; said second housing removably connected to said circuit breaker by means of said disconnect contacts; means to move said cooperating contacts from said engaged position to said disengaged position when said second housing is removed from said first housing; said fusible device associated with any one pole of said circuit breaker electrically connected to interrupt the current flow in its associated pole when the current magnitude exceeds a first predetermined value; each of said fusible devices comprising means to simultaneously move the cooperating contacts of all poles of said circuit breaker from said engaged position to said disengaged position; said housing for said circuit breaker having an extended base for supporting said disconnect contacts associated with said circuit breaker.

18. A circuit interrupting device comprising a housing including a base portion and a cover portion both of molded insulating material, separable contact means and means releasable to effect separation of said contact means, a pair of connectors connected in series relation with said separable contact means, one of said connectors being mounted on said base portion, an extension of molded insulating material supporting the other of said connectors, an insert in a hole in said base portion, a stud having a threaded portion engaging said insert to rigidly secure said extension to said base portion, and fuse means having terminals thereon engaging said pair of connectors.

19. A circuit interrupting device comprising a housing including a base portion and a cover portion both of molded insulating material, separable contact means and means releasable to effect separation of said contact means, a pair of connectors connected in series relationship with said separable contact means, one of said connectors being mounted on said base portion, said base portion having an extension of molded insulating material supporting the other of said connectors, and fuse means having terminals thereon engaging said pair of connectors.

References Cited in the file of this patent

UNITED STATES PATENTS

| | | |
|---|---|---|
| 974,109 | Auel et al. | Nov. 1, 1910 |
| 1,232,412 | Van Valkenburg | July 3, 1917 |
| 1,556,829 | Wyman | Oct. 13, 1925 |
| 1,686,289 | Milano | Oct. 2, 1928 |
| 1,700,757 | Benjamin | Feb. 5, 1929 |
| 2,072,730 | Corbett | Mar. 2, 1937 |
| 2,243,567 | Linde | May 27, 1941 |
| 2,330,690 | Dannenberg | Sept. 28, 1943 |
| 2,358,215 | Darling | Sept. 12, 1944 |
| 2,473,196 | Dannenberg | June 14, 1949 |
| 2,476,071 | Spiro | July 12, 1949 |
| 2,734,111 | Kozacka | Feb. 7, 1956 |
| 2,761,932 | Kozacka et al. | Sept. 4, 1956 |
| 2,794,096 | Kozacka | May 28, 1957 |
| 2,800,556 | Swain et al. | July 23, 1957 |

FOREIGN PATENTS

| | | |
|---|---|---|
| 13,522 | Australia | July 18, 1933 |